US012598464B2

(12) United States Patent
Atarius et al.

(10) Patent No.: US 12,598,464 B2
(45) Date of Patent: Apr. 7, 2026

(54) POLICIES RELATED TO NON-PUBLIC NETWORKS

(71) Applicant: Lenovo (Singapore) Pte. Ltd., New Tech Park (SG)

(72) Inventors: Roozbeh Atarius, La Jolla, CA (US); Genadi Velev, Darmstadt (DE); Dimitrios Karampatsis, Ruislip (GB); Apostolis Salkintzis, Athens (GR)

(73) Assignee: Lenovo (Singapore) Pte. Ltd., Singapore (SG)

(*) Notice: Subject to any disclaimer, the term of this patent is extended or adjusted under 35 U.S.C. 154(b) by 157 days.

(21) Appl. No.: 18/553,704

(22) PCT Filed: Mar. 31, 2021

(86) PCT No.: PCT/EP2021/058408
§ 371 (c)(1),
(2) Date: Oct. 2, 2023

(87) PCT Pub. No.: WO2022/207090
PCT Pub. Date: Oct. 6, 2022

(65) Prior Publication Data
US 2024/0187863 A1 Jun. 6, 2024

(51) Int. Cl.
*H04W 12/086* (2021.01)
*H04W 12/37* (2021.01)
(Continued)

(52) U.S. Cl.
CPC ......... *H04W 12/086* (2021.01); *H04W 12/37* (2021.01); *H04W 40/02* (2013.01); *H04W 40/246* (2013.01)

(58) Field of Classification Search
CPC ... H04W 12/086; H04W 12/37; H04W 40/02; H04W 40/246; H04W 48/18; H04L 65/1073
See application file for complete search history.

(56) References Cited

U.S. PATENT DOCUMENTS

| | | | | |
|---|---|---|---|---|
| 10,602,472 B2 * | 3/2020 | Lee | ....................... | H04W 60/00 |
| 10,609,667 B1 * | 3/2020 | Cakulev | ............... | H04B 7/0417 |

(Continued)

FOREIGN PATENT DOCUMENTS

| | | | | |
|---|---|---|---|---|
| WO | WO-2020092173 A1 * | 5/2020 | ............ | H04W 80/10 |
| WO | WO-2021187936 A1 * | 9/2021 | ............ | H04W 60/00 |

OTHER PUBLICATIONS

W. Y. Poe, J. Ordonez-Lucena and K. Mahmood, "Provisioning Private 5G Networks by Means of Network Slicing: Architectures and Challenges," 2020 IEEE International Conference on Communications Workshops (ICC Workshops), Dublin, Ireland, 2020, pp. 1-6. (Year: 2020).*

(Continued)

*Primary Examiner* — Michael R Vaughan
(74) *Attorney, Agent, or Firm* — Kunzler Needham & Hilton

(57) ABSTRACT

Apparatuses, methods, and systems are disclosed for policies related to non-public networks. One method includes receiving, at an access and mobility management function, a request to register a device. The method includes, in response to receiving the request to register the device, transmitting, by the access and mobility management function, a user equipment subscription data request to a unified data management. The method includes, in response to transmitting the user equipment subscription data request to the unified data management, receiving a user equipment subscription data response including a first identifier wherein the first identifier identities a stand-alone non-public network. The method includes performing an access and mobility management policy association establishment with a policy control function based on the user equipment subscription data. The method includes transparently trans- (Continued)

mitting by the policy control function a policy based on the first identifier.

12 Claims, 11 Drawing Sheets

(51) Int. Cl.
   *H04W 40/02*        (2009.01)
   *H04W 40/24*        (2009.01)

(56)                References Cited

U.S. PATENT DOCUMENTS

| | | | | |
|---|---|---|---|---|
| 11,457,403 | B2 * | 9/2022 | Kim | H04W 76/18 |
| 11,832,096 | B2 * | 11/2023 | Liao | H04W 80/10 |
| 12,160,757 | B2 * | 12/2024 | Xu | H04W 48/16 |
| 2019/0335392 | A1 * | 10/2019 | Qiao | H04W 48/16 |
| 2022/0078871 | A1 * | 3/2022 | Won | H04W 76/19 |
| 2022/0167299 | A1 * | 5/2022 | Xu | H04W 60/04 |
| 2022/0303935 | A1 * | 9/2022 | Olsson | H04W 12/06 |
| 2023/0135699 | A1 * | 5/2023 | Liao | H04W 4/50 |
| | | | | 370/252 |
| 2023/0189188 | A1 * | 6/2023 | Zhu | H04W 60/04 |
| | | | | 455/435.1 |

OTHER PUBLICATIONS

A. Jerichow, B. Covell, D. Chandramouli, A. Rezaki, A. Lansisalmi and J. Merkel, "3GPP Non-Public Network Security," in Journal of ICT Standardization, vol. 8, No. 1, pp. 57-76, 2020 (Year: 2020).*
ETSI. 2020. 5G; System architecture for the 5G System (5GS), ETSI TS 123 501 V16.6.0 (Oct. 2020). (Year: 2020).*
ETSI. 2020. 5G; Procedures for the 5G System (5GS), ETSI TS 123 502 V16.6.0 (Oct. 2020). (Year: 2020).*

PCT/EP2021/058408, "International Search Report and the Written Opinion of the International Searching Authority, or the Declaration", International Searching Authority, Jun. 7, 2022, pp. 1-13.
TSG, "Presentation of TR 23.700-07: 'Study on enhanced support of Non-Public Networks (NPN)' to TSG SA for information", TSG SA Meeting #SP-90E SP-200967, Dec. 8-14, 2020, pp. 1-2.
3GPP, "3rd Generation Partnership Project; Technical Specification Group Services and System Aspects; Study on enhanced support of non-public networks (Release 17)", 3GPP TR 23.700-07 V1.2.0, Nov. 2020, pp. 1-247.
3GPP, "3rd Generation Partnership Project; Technical Specification Group Core Network and Terminals; Numbering, addressing and identification; (Release 16)", 3GPP TS 23.003 V16.6.0, Mar. 2021, pp. 1-143.
3GPP, "3rd Generation Partnership Project; Technical Specification Group Services and System Aspects; System architecture for the 5G System (5GS); Stage 2 (Release 16)", 3GPP TS 23.501 V16.7.0, Dec. 2020, pp. 1-450.
3GPP, "3rd Generation Partnership Project; Technical Specification Group Services and System Aspects; Procedures for the 5G System (5GS); Stage 2 (Release 16)", 3GPP TS 23.502 V16.7.1, Jan. 2021, pp. 1-603.
3GPP, "3rd Generation Partnership Project; Technical Specification Group Services and System Aspects; Policy and charging control framework for the 5G System (5GS); Stage 2 (Release 17)", 3GPP TS 23.503 V17.0.0, Mar. 2021, pp. 1-128.
3GPP, "3rd Generation Partnership Project; Technical Specification Group Core Network and Terminals; Non-Access-Stratum (NAS) protocol for 5G System (5GS); Stage 3; (Release 17)", 3GPP TS 24.501 V17.1.0, Dec. 2020, pp. 1-745.
3GPP, "3rd Generation Partnership Project; Technical Specification Group Core Network and Terminals; User Equipment (UE) policies for 5G System (5GS); Stage 3 (Release 17)", 3GPP TS 24.526 V17.1.0, Dec. 2020, pp. 1-52.
3GPP, "3rd Generation Partnership Project; Technical Specification Group Core Network and Terminals; 5G System; UE Policy Control Service; Stage 3 (Release 17)", 3GPP TS 29.525 V17.1.0, Dec. 2020, pp. 1-59.

* cited by examiner

200

Remote Unit
102

| | |
|---|---|
| Processor 202 | Memory 204 |
| Input Device 206 | Display 208 |
| Transmitter 210 | Receiver 212 |
| Network Interface(s) 214 | Application Interface(s) 216 |

300

400

500

| UE 502 | AMF 504 | PCF 506 | UDM 508 | UDR 510 |
|---|---|---|---|---|

512

514

516

518

520

522

524

526

528

600

700

| UE 702 | RAN 704 | AMF 706 | PCF 708 | N3IWF 710 | AMF/SMF/ UPF 712 |

714

716

718

720

722

724

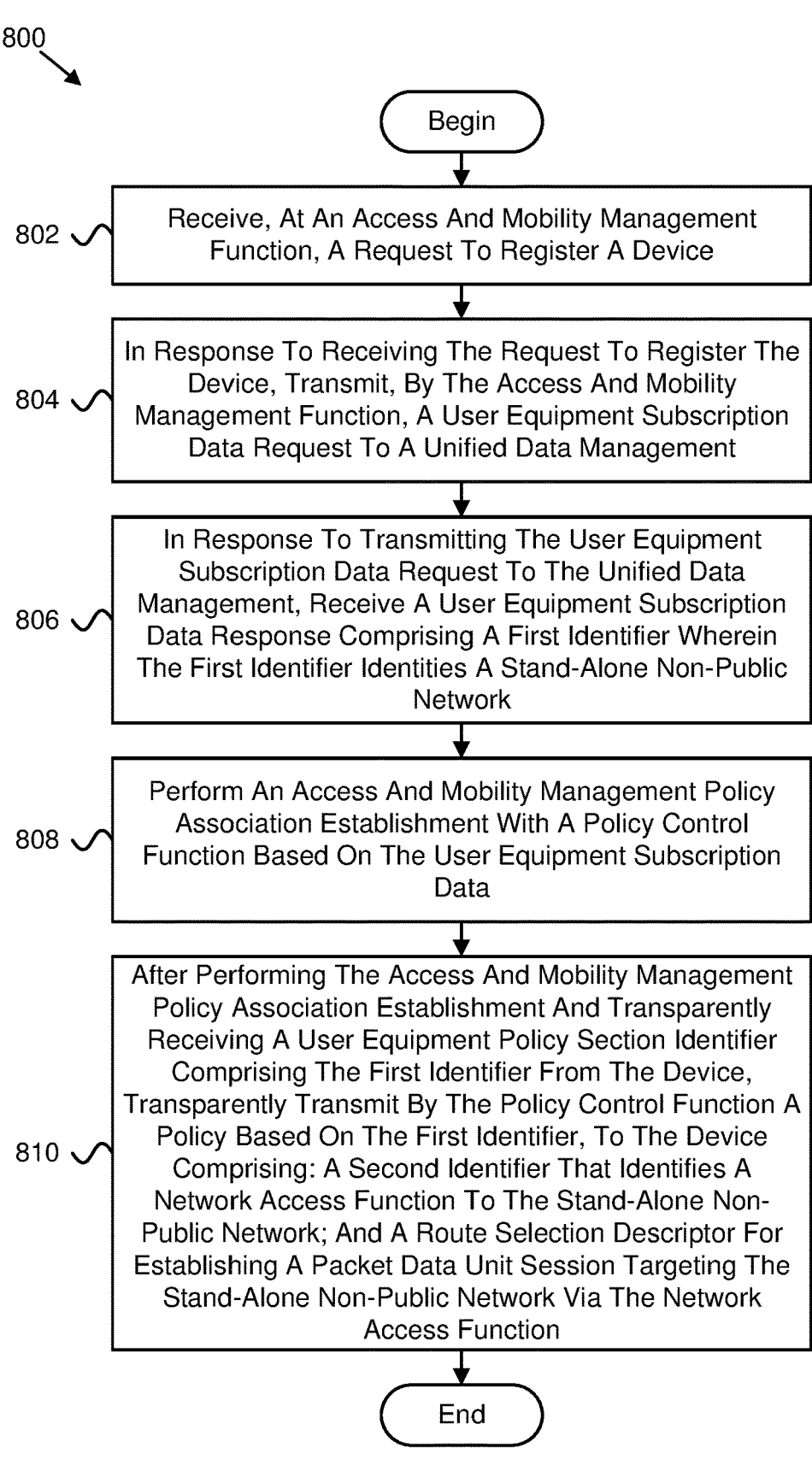

800

Begin

802   Receive, At An Access And Mobility Management Function, A Request To Register A Device 804   In Response To Receiving The Request To Register The Device, Transmit, By The Access And Mobility Management Function, A User Equipment Subscription Data Request To A Unified Data Management 806   In Response To Transmitting The User Equipment Subscription Data Request To The Unified Data Management, Receive A User Equipment Subscription Data Response Comprising A First Identifier Wherein The First Identifier Identities A Stand-Alone Non-Public Network 808   Perform An Access And Mobility Management Policy Association Establishment With A Policy Control Function Based On The User Equipment Subscription Data 810   After Performing The Access And Mobility Management Policy Association Establishment And Transparently Receiving A User Equipment Policy Section Identifier Comprising The First Identifier From The Device, Transparently Transmit By The Policy Control Function A Policy Based On The First Identifier, To The Device Comprising: A Second Identifier That Identifies A Network Access Function To The Stand-Alone Non-Public Network; And A Route Selection Descriptor For Establishing A Packet Data Unit Session Targeting The Stand-Alone Non-Public Network Via The Network Access Function End

FIG. 8

1000

Begin

↓

1002 — Receive, By A Device, A Policy Comprising A User Equipment Route Selection Policy From A Policy Control Function, Wherein The User Equipment Route Selection Policy Comprises: A Traffic Descriptor; And Mapping Route Selection Descriptors

↓

1004 — Identify, By The Device, The Traffic Descriptor With The Mapping Route Selection Descriptors, Wherein The Traffic Descriptor Matches An Identifier That Is Preconfigured In The Device

↓

1006 — Use, By The Device, The Identifier As A Remote Destination Address To Establish A Packet Data Unit Session, By The Mapping Route Selection Descriptors, Targeted To A Stand-Alone Non-Public Network

↓

End

FIG. 10

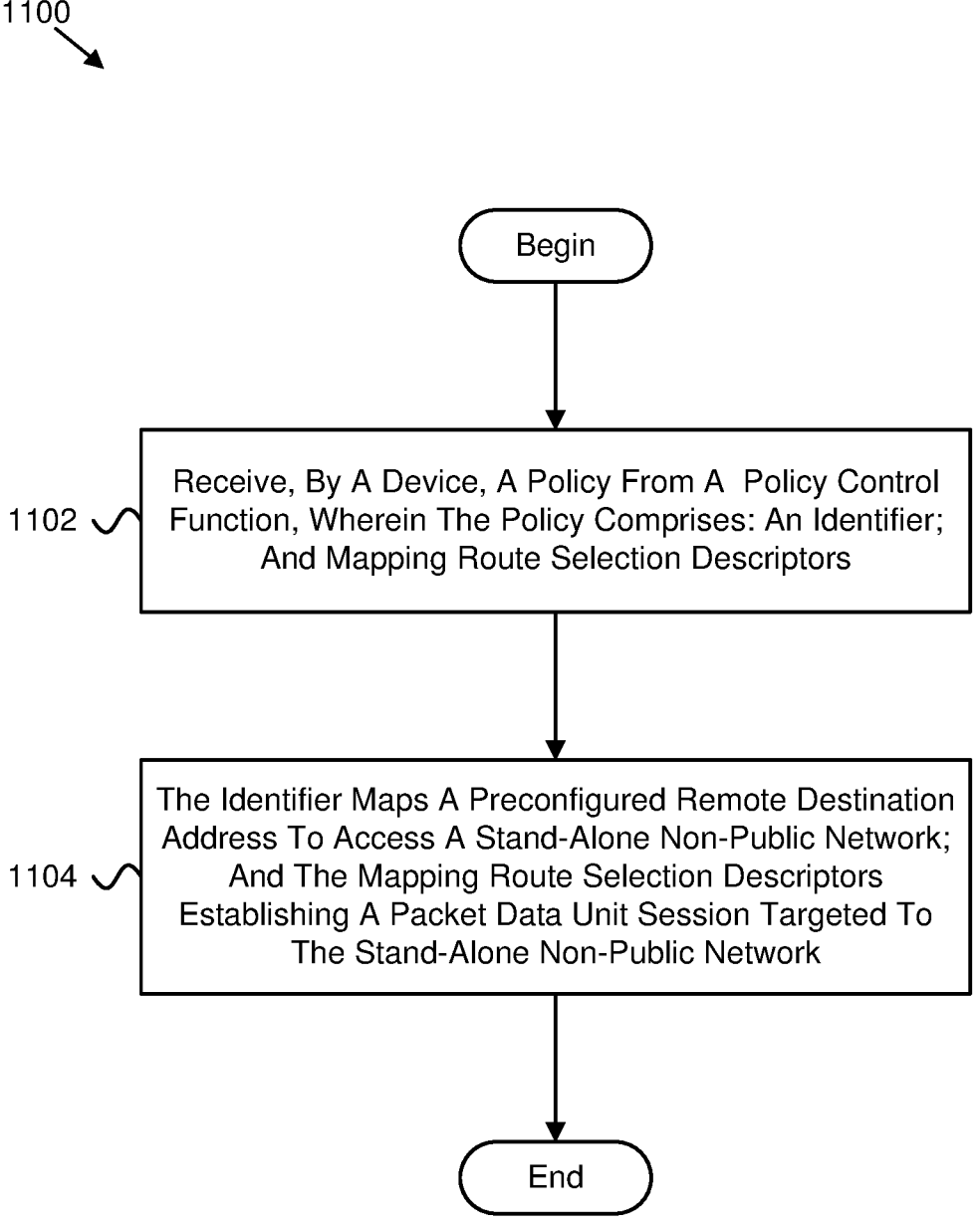

1100

Begin

1102 — Receive, By A Device, A Policy From A Policy Control Function, Wherein The Policy Comprises: An Identifier; And Mapping Route Selection Descriptors 1104 — The Identifier Maps A Preconfigured Remote Destination Address To Access A Stand-Alone Non-Public Network; And The Mapping Route Selection Descriptors Establishing A Packet Data Unit Session Targeted To The Stand-Alone Non-Public Network End

FIG. 11

POLICIES RELATED TO NON-PUBLIC NETWORKS

FIELD

The subject matter disclosed herein relates generally to wireless communications and more particularly relates to policies related to non-public networks.

BACKGROUND

In certain wireless communications networks, stand-alone public networks may be used. Polices may not be configured for the stand-alone public networks.

BRIEF SUMMARY

Methods for policies related to non-public networks are disclosed. Apparatuses and systems also perform the functions of the methods. One embodiment of a method includes receiving, at an access and mobility management function, a request to register a device. In some embodiments, the method includes, in response to receiving the request to register the device, transmitting, by the access and mobility management function, a user equipment subscription data request to a unified data management. In various embodiments, the method includes, in response to transmitting the user equipment subscription data request to the unified data management, receiving a user equipment subscription data response comprising a first identifier wherein the first identifier identities a stand-alone non-public network. In certain embodiments, the method includes performing an access and mobility management policy association establishment with a policy control function based on the user equipment subscription data. In some embodiments, the method includes, after performing the access and mobility management policy association establishment and transparently receiving a user equipment policy section identifier comprising the first identifier from the device, transparently transmitting by the policy control function a policy based on the first identifier, to the device comprising: a second identifier that identifies a network access function to the stand-alone non-public network; and a route selection descriptor for establishing a packet data unit session targeting the stand-alone non-public network via the network access function.

One apparatus for policies related to non-public networks includes an access and mobility management function. The apparatus further includes a receiver that receives a request to register a device. In various embodiments, the apparatus includes a transmitter that, in response to receiving the request to register the device, transmits a user equipment subscription data request to a unified data management. In some embodiments, the apparatus includes a processor. In certain embodiments, in response to transmitting the user equipment subscription data request to the unified data management, the receiver receives a user equipment subscription data response comprising a first identifier wherein the first identifier identities a stand-alone non-public network; the processor performs an access and mobility management policy association establishment with a policy control function based on the user equipment subscription data; and the transmitter, after performing the access and mobility management policy association establishment and the receiver transparently receives a user equipment policy section identifier comprising the first identifier from the device, transparently transmits by the policy control function a policy based on the first identifier, to the device comprising: a second identifier that identifies a network access function to the stand-alone non-public network; and a route selection descriptor for establishing a packet data unit session targeting the stand-alone non-public network via the network access function.

Another method for policies related to non-public networks includes receiving, at a policy control function, a user equipment policy section identifier comprising a first identifier from a device, wherein the first identifier identifies a stand-alone non-public network. In some embodiments, the method includes, in response to receiving the user equipment policy section identifier and based on the identifier, transmitting, by the policy control function, a subscription data request to a unified data repository. In various embodiments, the method includes, in response to receiving the subscription data from the unified data repository, determining, by the policy control function, a validity of the user equipment policy section identifier for the device. In certain embodiments, the method includes, after the validity is confirmed, transmitting, by the policy control function, a policy based on the first identifier, the policy comprising: a second identifier that identifies a network access function to the stand-alone non-public network; and a route selection descriptor for establishing a packet data unit session targeting the stand-alone non-public network via the network access function.

Another apparatus for policies related to non-public networks includes a policy control function. The apparatus further includes a receiver that receives a user equipment policy section identifier comprising a first identifier from a device, wherein the first identifier identifies a stand-alone non-public network. In various embodiments, the apparatus includes a transmitter that, in response to receiving the user equipment policy section identifier and based on the identifier, transmits a subscription data request to a unified data repository. In some embodiments, the apparatus includes a processor that, in response to receiving the subscription data from the unified data repository, determines a validity of the user equipment policy section identifier for the device. In certain embodiments, the transmitter, after the validity is confirmed, transmits a policy based on the first identifier, the policy comprising: a second identifier that identifies a network access function to the stand-alone non-public network; and a route selection descriptor for establishing a packet data unit session targeting the stand-alone non-public network via the network access function.

A further method for policies related to non-public networks includes receiving, by a device, a policy comprising a user equipment route selection policy from a policy control function, wherein the user equipment route selection policy comprises: a traffic descriptor; and mapping route selection descriptors. In some embodiments, the method includes identifying, by the device, the traffic descriptor with the mapping route selection descriptors, wherein the traffic descriptor matches an identifier that is preconfigured in the device. In various embodiments, the method includes using, by the device, the identifier as a remote destination address to establish a packet data unit session, by the mapping route selection descriptors, targeted to a stand-alone non-public network.

A further apparatus for policies related to non-public networks includes a receiver that receives a policy comprising a user equipment route selection policy from a policy control function, wherein the user equipment route selection policy comprises: a traffic descriptor; and mapping route selection descriptors. In various embodiments, the apparatus includes a processor that: identifies the traffic descriptor with the mapping route selection descriptors, wherein the traffic descriptor matches an identifier that is preconfigured in the apparatus; and uses the identifier as a remote destination address to establish a packet data unit session, by the mapping route selection descriptors, targeted to a stand-alone non-public network.

A method for policies related to non-public networks includes receiving, by a device, a policy from a policy control function, wherein the policy comprises: an identifier; and mapping route selection descriptors. In various embodiments, the identifier maps a preconfigured remote destination address to access a stand-alone non-public network; and the mapping route selection descriptors establishing a packet data unit session targeted to the stand-alone non-public network.

An apparatus for policies related to non-public networks includes a receiver that receives a policy from a policy control function, wherein the policy comprises: an identifier; and mapping route selection descriptors. In various embodiments, the identifier maps a preconfigured remote destination address to access a stand-alone non-public network; and the mapping route selection descriptors establishing a packet data unit session targeted to the stand-alone non-public network.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 8 is a flow chart diagram illustrating one embodiment of a method for policies related to non-public networks;

FIG. 10 is a flow chart diagram illustrating a further embodiment of a method for policies related to non-public networks; and FIG. 11 is a flow chart diagram illustrating yet another embodiment of a method for policies related to non-public networks.

DETAILED DESCRIPTION

Figure 1:
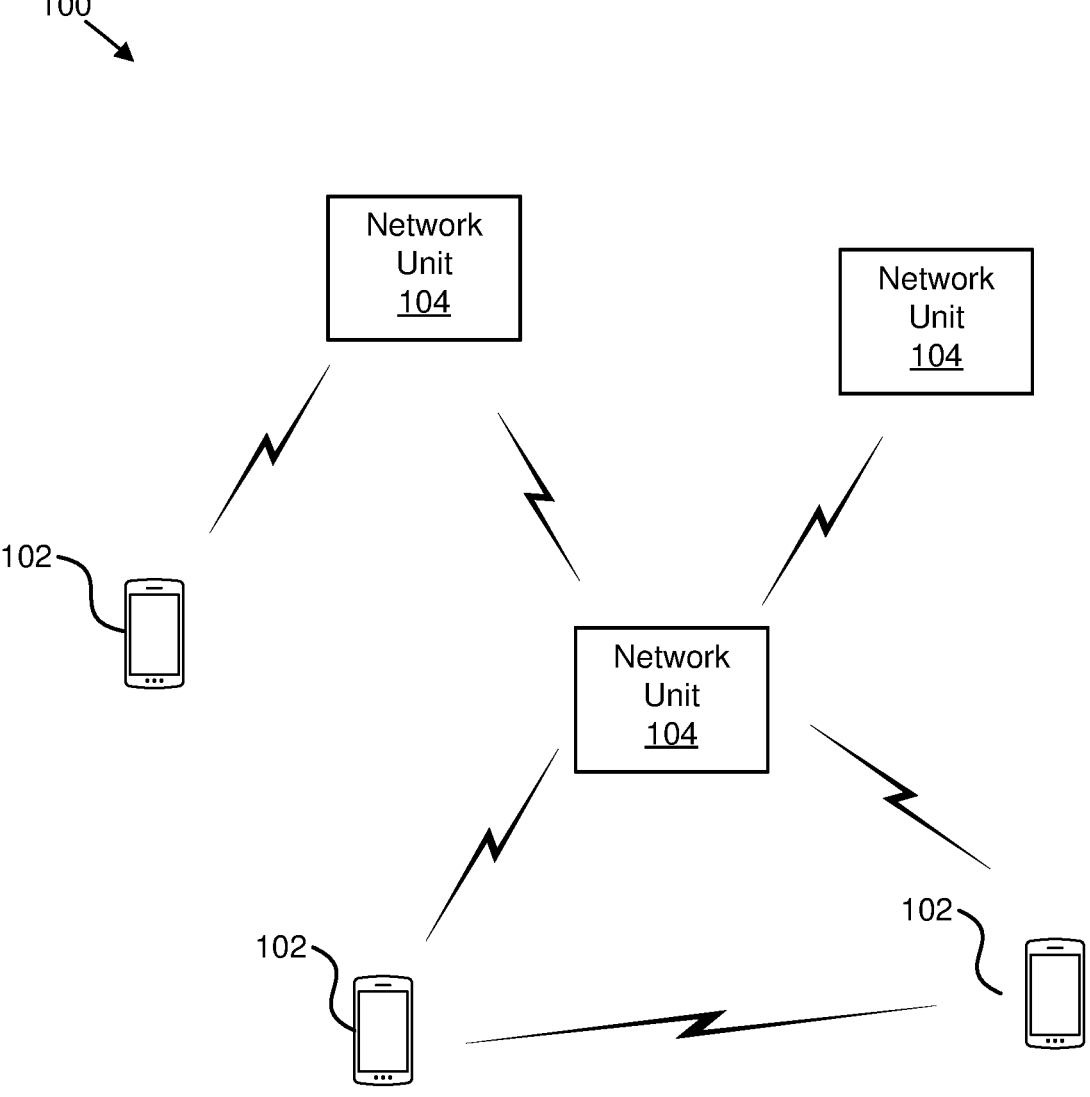
FIG. 1 is a schematic block diagram illustrating one embodiment of a wireless communication system for policies related to non-public networks.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for policies related to non-public networks. In one embodiment, the wireless communication system 100 includes remote units 102, and network units 104. Even though a specific number of remote units 102, and network units 104 are depicted in FIG. 1, one of skill in the art will recognize that any number of remote units 102, and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to and/or may include one or more of an access point, an access terminal, a base, a base station, a Node-B, an evolved node-B ("eNB"), a 5G node-B ("gNB"), a Home Node-B, a relay node, a device, a core network, an aerial server, a radio access node, an access point ("AP"), new radio ("NR"), a network entity, an access and mobility management function ("AMF"), a unified data management ("UDM"), a unified data repository ("UDR"), a UDM/UDR, a policy control function ("PCF"), a radio access network ("RAN"), a network slice selection function ("NSSF"), an operations, administration, and management ("OAM"), a session management function ("SMF"), a user plane function ("UPF"), an application function, a vehicle-to-everything configuration function, an vertical application enabler server, an edge enabler server, an edge configuration server, a mobile edge computing platform function, a mobile edge computing application, or by any other terminology used in the art. In some embodiments, the network unit 104 may be any device and/or function that is not a remote unit 102 (e.g., separate from a remote unit 102). The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in third generation partnership project ("3GPP"), wherein the network unit 104 transmits using an OFDM modulation scheme on the downlink ("DL") and the remote units 102 transmit on the uplink ("UL") using a single-carrier frequency division multiple access ("SC-FDMA") scheme or an orthogonal frequency division multiplexing ("OFDM") scheme. More generally, however, the wireless communication system 100 may implement some other open or proprietary communication protocol, for example, WiMAX, institute of electrical and electronics engineers ("IEEE") 802.11 variants, global system for mobile communications ("GSM"), general packet radio service ("GPRS"), universal mobile telecommunications system ("UMTS"), long term evolution ("LTE") variants, code division multiple access 2000 ("CDMA2000"), Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a network unit 104 may receive a request to register a device. In some embodiments, the network unit 104 may, in response to receiving the request to register the device, transmit, by the access and mobility management function, a user equipment subscription data request to a unified data management. In various embodiments, the network unit 104 may, in response to transmitting the user equipment subscription data request to the unified data management, receive a user equipment subscription data response comprising a first identifier wherein the first identifier identities a stand-alone non-public network. In certain embodiments, the network unit 104 may perform an access and mobility management policy association establishment with a policy control function based on the user equipment subscription data. In some embodiments, the network unit 104, after performing the access and mobility management policy association establishment and transparently receiving a user equipment policy section identifier comprising the first identifier from the device, transparently transmits by the policy control function a policy based on the first identifier, to the device comprising: a second identifier that identifies a network access function to the stand-alone non-public network; and a route selection descriptor for establishing a packet data unit session targeting the stand-alone non-public network via the network access function. Accordingly, the network unit 104 may be used for policies related to non-public networks.

In certain embodiments, a network unit 104 may receive, at a policy control function, a user equipment policy section identifier comprising a first identifier from a device, wherein the first identifier identifies a stand-alone non-public network. In some embodiments, the network unit 104 may, in response to receiving the user equipment policy section identifier and based on the identifier, transmit, by the policy control function, a subscription data request to a unified data repository. In various embodiments, the network unit 104 may, in response to receiving the subscription data from the unified data repository, determine, by the policy control function, a validity of the user equipment policy section identifier for the device. In certain embodiments, the network unit 104 may, after the validity is confirmed, transmit, by the policy control function, a policy based on the first identifier, the policy comprising: a second identifier that identifies a network access function to the stand-alone non-public network; and a route selection descriptor for establishing a packet data unit session targeting the stand-alone non-public network via the network access function. Accordingly, the network unit 104 may be used for policies related to non-public networks.

In various embodiments, a remote unit 102 (e.g., a device) may receive a policy comprising a user equipment route selection policy from a policy control function, wherein the user equipment route selection policy comprises: a traffic descriptor; and mapping route selection descriptors. In some embodiments, the remote unit 102 may identify the traffic descriptor with the mapping route selection descriptors, wherein the traffic descriptor matches an identifier that is preconfigured in the remote unit 102. In various embodiments, the remote unit 102 may use the identifier as a remote destination address to establish a packet data unit session, by the mapping route selection descriptors, targeted to a stand-alone non-public network. Accordingly, the remote unit 102 may be used for policies related to non-public networks.

In certain embodiments, a remote unit 102 (e.g., a device) may receive a policy from a policy control function, wherein the policy comprises: an identifier; and mapping route selection descriptors. In various embodiments, the identifier maps a preconfigured remote destination address to access a stand-alone non-public network; and the mapping route selection descriptors establishing a packet data unit session targeted to the stand-alone non-public network. Accordingly, the remote unit 102 may be used for policies related to non-public networks.

Figure 2:
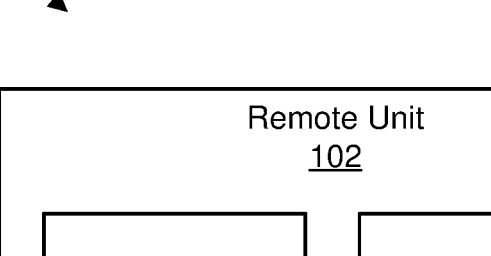
FIG. 2 is a schematic block diagram illustrating one embodiment of an apparatus that may be used for policies related to non-public networks.

FIG. 2 depicts one embodiment of an apparatus 200 that may be used for policies related to non-public networks. The apparatus 200 includes one embodiment of the remote unit 102. Furthermore, the remote unit 102 may include a processor 202, a memory 204, an input device 206, a display 208, a transmitter 210, a receiver 212, one or more network interfaces 214, and one or more application interfaces 216. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD"), a light emitting diode ("LED") display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

In certain embodiments, the receiver 212 receives a policy comprising a user equipment route selection policy from a policy control function, wherein the user equipment route selection policy comprises: a traffic descriptor; and mapping route selection descriptors. In various embodiments, the processor 202: identifies the traffic descriptor with the mapping route selection descriptors, wherein the traffic descriptor matches an identifier that is preconfigured in the apparatus 200; and uses the identifier as a remote destination address to establish a packet data unit session, by the mapping route selection descriptors, targeted to a stand-alone non-public network.

In some embodiments, the receiver 212 receives a policy from a policy control function, wherein the policy comprises: an identifier; and mapping route selection descriptors. In various embodiments, the identifier maps a preconfigured remote destination address to access a stand-alone non-public network; and the mapping route selection descriptors establishing a packet data unit session targeted to the stand-alone non-public network.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
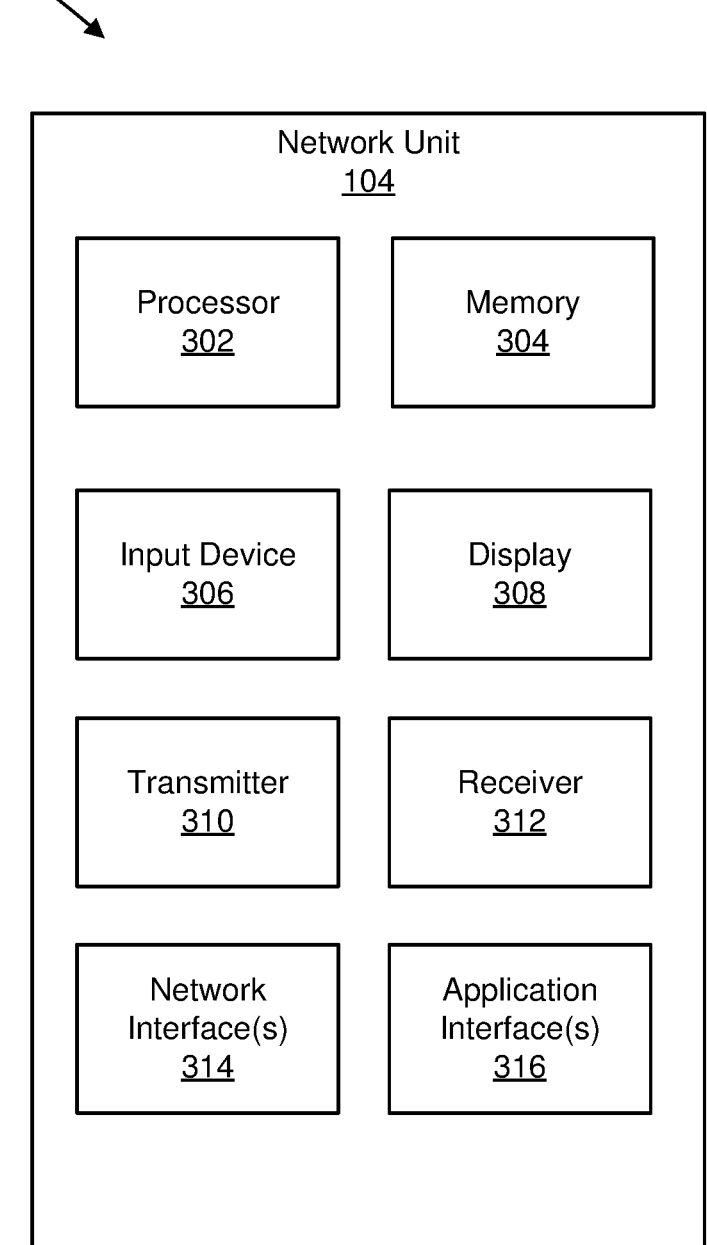
FIG. 3 is a schematic block diagram illustrating another embodiment of an apparatus that may be used for policies related to non-public networks.

FIG. 3 depicts another embodiment of an apparatus 300 that may be used for policies related to non-public networks. The apparatus 300 includes one embodiment of the network unit 104. Furthermore, the network unit 104 may include a processor 302, a memory 304, an input device 306, a display 308, a transmitter 310, a receiver 312, one or more network interfaces 314, and one or more application interfaces 316. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In one embodiment, the receiver 312 receives a request to register a device. In various embodiments, the transmitter 310, in response to receiving the request to register the device, transmits a user equipment subscription data request to a unified data management. In certain embodiments, in response to transmitting the user equipment subscription data request to the unified data management, the receiver 312 receives a user equipment subscription data response comprising a first identifier wherein the first identifier identities a stand-alone non-public network; the processor 302 performs an access and mobility management policy association establishment with a policy control function based on the user equipment subscription data; and the transmitter 310, after performing the access and mobility management policy association establishment and the receiver transparently receives a user equipment policy section identifier comprising the first identifier from the device, transparently transmits by the policy control function a policy based on the first identifier, to the device comprising: a second identifier that identifies a network access function to the stand-alone non-public network; and a route selection descriptor for establishing a packet data unit session targeting the stand-alone non-public network via the network access function.

In certain embodiments, the receiver 312 receives a user equipment policy section identifier comprising a first identifier from a device, wherein the first identifier identifies a stand-alone non-public network. In various embodiments, the transmitter 310, in response to receiving the user equipment policy section identifier and based on the identifier, transmits a subscription data request to a unified data repository. In some embodiments, the processor 302, in response to receiving the subscription data from the unified data repository, determines a validity of the user equipment policy section identifier for the device. In certain embodiments, the transmitter 310, after the validity is confirmed, transmits a policy based on the first identifier, the policy comprising: a second identifier that identifies a network access function to the stand-alone non-public network; and a route selection descriptor for establishing a packet data unit session targeting the stand-alone non-public network via the network access function.

In some embodiments, for a PCF to send rules towards a UE including an identifier for targeting one SNPN or another SNPN, the PCF may access information for the UE's subscription and the UE's location. In such embodiments, it may not be clear how the PCF determines which SNPN should serve a UE if establishing a PDU session targeting a particular SNPN.

In various embodiments, an authorized UE in a 3GPP network with multiple USIMs or multiple USIM applications may register to a public land mobile network ("PLMN") and at least one standalone non-public network ("SNPN") simultaneously. In some embodiments, the registrations may be independent. Moreover, in other embodiments, the registrations may be dependent and may communicate via each other. In certain embodiments, a UE may receive a UE policy from a PLMN. In such embodiments, the UE may use the received policies to establish PDU sessions targeting an SNPN. Moreover, in such embodiments, it may not be clear how the UE establishes the PDU sessions targeted to the SNPN by route selection descriptors received from the PLMN.

In some embodiments, a PLMN policy for a UE may be sent to the UE as UE route selection policy ("URSP") rules or an access network discovery and selection policy ("ANDSP"). In such embodiments, the URSP may have information about route selection descriptor ("RSD") and traffic descriptor, while the ANDSP may have information about a wireless local area network ("WLAN") selection policy ("WLANSP") and a non-3GPP access network ("N3AN") rule.

In certain embodiments, route selection descriptors may be predetermined and/or may include components such as types for a session and service continuity ("SSC") mode, single network slice selection assistance information ("S-NSSAI"), a data network name ("DNN"), a packet data unit ("PDU") session type, a preferred access type, a multi-access preference, a non-seamless no-3GPP offload indication, location criteria, and/or time window.

In various embodiments, traffic descriptors may be predetermined and/or may include components such as types for match-all, an operating system ("OS") identifier ("ID") plus an OS application identifier ("App ID"), an IPV4 remote address, an IPV6 remote address and/or prefix length, a protocol identifier and/or next header, a single remote port, a remote port range, an IP 3 tuple, a security parameter index, a type of service and/or traffic class, a flow label, a destination MAC address, a 802.1Q C-TAG VID, a 802.1Q S-TAG VID, a 802.1Q C-TAG PCP and/or drop eligibility indicator ("DEI"), 802.1Q S-TAG PCP and/or DEI, an ethertype, a DNN, a connection capabilities type, a destination FQDN, a regular expression, and/or an OS App ID.

In some embodiments, a relationship between route selection descriptors and traffic descriptor may be many to one (e.g., one or more route selection descriptors and one traffic descriptor may be in one URSP rule).

In certain embodiments, an N3AN rule includes information for non-3GPP interworking function ("N3IWF") or information for evolved packet data gateway ("ePDG").

In various embodiments, for a UE to establish a data flow, it may use a traffic descriptor and related RSD. The related RSD describes a packet data unit ("PDU") session for the data flow.

In some embodiments, a multi universal subscriber identity module ("USIM") use equipment ("UE") or a UE with multiple USIM applications may be able to establish simultaneous registrations to a PLMN and a SNPN and may establish PDU sessions within those connections. In certain embodiments, a UE may register with a PLMN and/or may register to an SNPN via the PLMN. In various embodiments, a UE may also register with an SNPN and/or may register to a PLMN via the SNPN.

In certain embodiments, a URSP from a PLMN includes RSD rules for an SNPN. In such embodiments, this may be achieved by assuming that RSD has a mapping traffic descriptor equal to an N3IWF identifier that is used to access the SNPN. In various embodiments, it may be unknown how a PCF knows which policies for an SNPN are to be transmitted to a UE. In some embodiments, a UE may not know that policies are for an SNPN.

Figure 4:
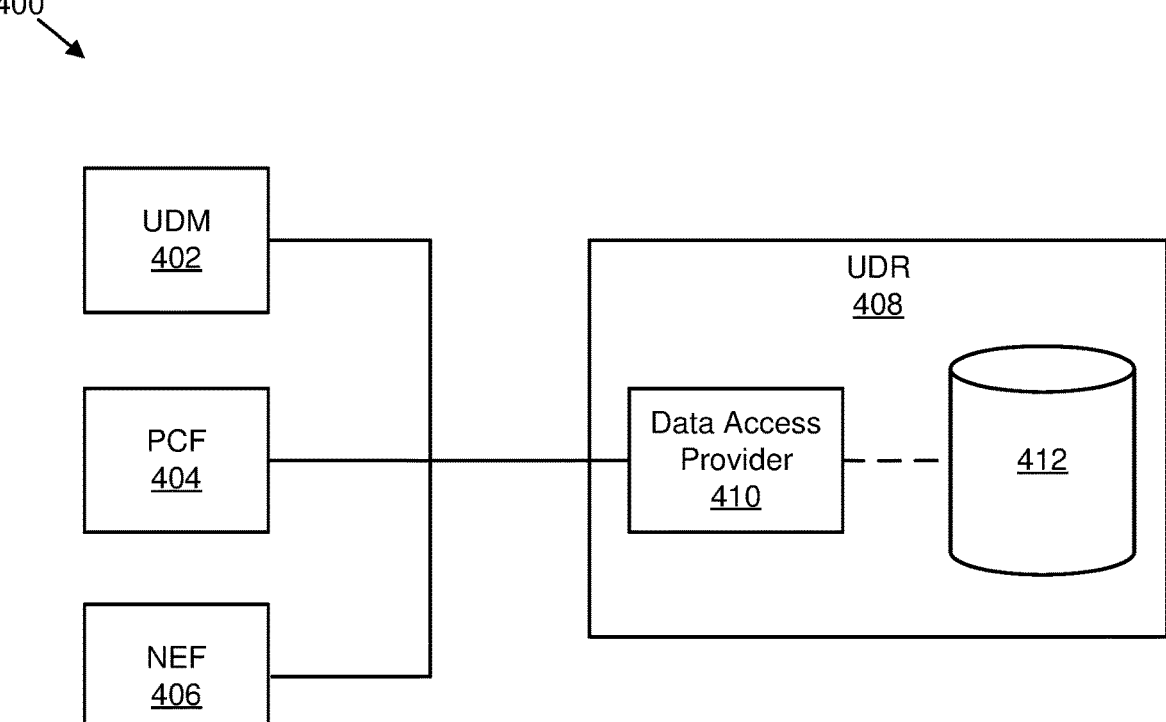
FIG. 4 is a schematic block diagram illustrating one embodiment of a data storage architecture.

In some embodiments, a unified data management ("UDM") and a policy control function ("PCF") may store a UE's policy data in a unified data repository ("UDR"). Such embodiments may have been deployed in a PLMN where a UE is registered. In such embodiments, the UDR may store the UE's subscription data and structured data for exposure and application data. FIG. 4 illustrates a relationship between various network entities.

FIG. 4 is a schematic block diagram illustrating one embodiment of a data storage architecture 400. The data storage architecture 400 includes a UDM 402, PCF 404, and a network exposure function ("NEF") 406 that communicate with a UDR 408 via N35, N36, and N37 respectively (e.g., Nudr). The UDR 408 includes a data access provider 410 and a data storage 412 (e.g., including subscription data, policy data, structured data for exposure, and/or application data).

In various embodiments, an AMF may fetch subscription information for a UE's usage of an SNPN for the UE's mobility such as location from a UDM managing the UE's subscription information and may provide the subscription information to a PCF in form of establishing a policy association. The PCF may use the established policy association for the UE's mobility if providing the UE policies for PDU sessions.

In certain embodiments, since an SNPN's N3IWF ID may be part of a URSP as a traffic descriptor, a PCF in a PLMN domain may not be aware of whether a URSP rule is to be transmitted towards a UE applicable to the SNPN. The PCF may send all existing URSP rules to the UE and, once the UE receives the URSP rules, the PCF may match a traffic descriptor to the SNPN's N3IWF ID which is preconfigured in the UE. If the traffic descriptor and the SNPN's N3IWF ID match, the UE may use an RSD for establishing a PDU session via N3IWF for the SNPN. In such embodiments, the PCF may need to provide all URSP rules including those for all SNPNs that the UE has a subscription.

In some embodiments, at a time of UE registration, an AMF may perform access and mobility management policy association establishment and may acquire a serving network in the form of a PLMN ID, an SNPN ID, or a PLMN ID and a network identifier ("NID"), and may provide the information to the PCF in the form of establishing a policy association. The UE may also provide the PLMN ID and SNPN ID to the PCF after a successful registration to the network. Once the PCF has the information about the PLMN ID and/or SNPN ID, the UE may use that information to establish policy associations for the UE either internally or by requesting from the UE policies in the UDR. The PCF may provide to the UE the policies for PDU sessions related to the SNPN due to an SNPN ID and/or an associated PLMN ID.

Figure 5:
FIG. 5 is a communications diagram illustrating one embodiment of policy transmission to a UE based on policy association information.

FIG. 5 is a communications diagram 500 illustrating one embodiment of policy transmission to a UE based on policy association information. The illustrated communications include communications between a UE 502, an AMF 504, a PCF 506, a UDM 508, and a UDR 510. Any of the communications in the communication diagram 500 may include one or more messages.

In a first communication 512 transmitted between the UE 502 and the AMF 504, the UE 502 registers to a network via communications with the AMF 504.

In a second communication 514 transmitted between the AMF 504, the PCF 506, and the UDM 508, the AMF 504 may create a UE context and may request subscription data from the UDM 508. In a third communication 516 transmitted between the UDM 508 and the UDR 510, the UDM 508 may need to retrieve this information from the stored subscription information data in UDR 510. In a fourth communication 518 transmitted between the AMF 504, the PCF 506, and the UDM 508, once retrieved from the UDR 510, the AMF 504 receives the access the mobility subscription, SMF selection subscription data, UE context in SMF data and location services ("LCS") mobile origination for the UE location information, and the UE's subscription data for the SNPN.

In a fifth communication 520 transmitted between the AMF 504 and the PCF 506, based on the local policy, the AMF 504 may perform access and mobility management policy association establishment by sending information about a serving network in the form of subscription permanent identifier ("SUPI"), subscription notification indication, service area restrictions, allowed NSSAI, access type and RAT type, permanent equipment identifier ("PEI"), UE time zone and serving network's PLMN ID, or PLMN ID and/or NID. Information about a subscribed SNPN ID may also be included.

In a sixth communication 522 transmitted between the UE 502, the AMF 504, and the PCF 506, the UE 502 may send information about preconfigured PLMNs and/or associated or not associated SNPNs using a UE policy section identifier ("UPSI") list.

The PCF 506 may internally retrieve 524 policy information. In a seventh communication 526 transmitted between the PCF 506, the UDM 508, and the UDR 510, due to the SNPN ID, PLMN ID, or PLMN ID and/or NID, the PCF 506 may retrieve N3IWF ID information to access one or more SNPNs associated or not associated with the PLMNs and URSP rules including route selection descriptors for one or more SNPNs either: 1) internally; and/or 2) from the UE policy from the UDR 510. The N3IWF ID information may include mapping traffic descriptors for related route selection descriptors in URSP rules which the UE 502 may use to establish one or more PDU sessions targeted to one or more SNPNs.

In an eighth communication 528 transmitted between the UE 502, the AMF 504, and the PCF 506, the PCF 506 sends the UE policy toward the UE 502.

In certain embodiments, an N3IWF ID may be used to access a SNPN and a N3IWF ID may be an IP address type such as IPv4, IPv6, or IPv4IPv6, or it may be of fully qualified domain name ("FQDN") type. If the N3IWF identifier is a FQDN, the format may be: "n3iwf.5gc.nid<NID>.mnc<MNC>.mcc<MCC>.pub.3gp pnetwork.org" or "n3iwf.<SNPN domain name>."

In certain embodiments, the traffic descriptor may include components such as types for: match-all; operating system identifier ("OS ID") plus operating system application identifier ("OS App ID"); IPv4 remote address; IPv6 remote address and/or prefix length; protocol identifier and/or next header; single remote port; remote port range; IP 3 tuple; security parameter index; type of service and/or traffic class; flow label; destination MAC address; 802.1Q C-TAG VID; 802.1Q S-TAG VID; 802.1Q C-TAG priority code point ("PCP") and/or DEI: 802.1Q S-TAG PCP and/or DEI; ethertype; DNN; connection capabilities type; destination FQDN; regular expression; and/or OS App ID.

In some embodiments, an N3IWF ID which may be an IP address, an FQDN, and/or a component of a traffic descriptor in a URSP rule. In certain embodiments, mapping route selection descriptors may include PDU session rules used to establish PDU sessions targeting a SNPN reached by a N3IWF ID.

Figure 6:
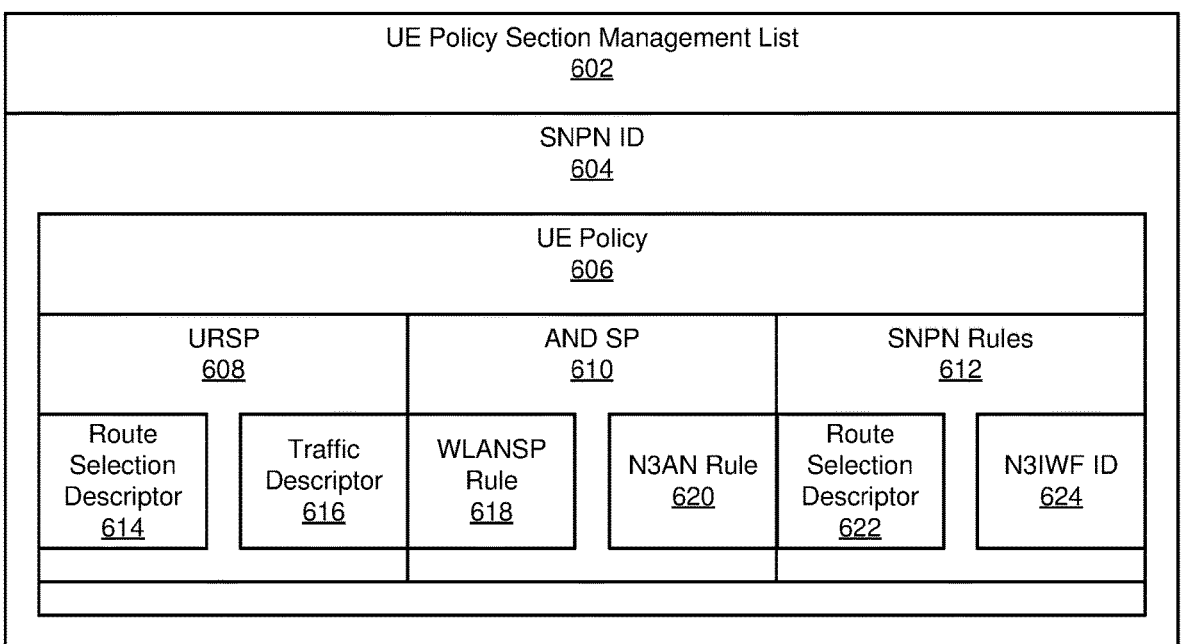
FIG. 6 is a block diagram illustrating one embodiment of a format of a UE policy sent by a PLMN.

In various embodiments, a UE may select route selection descriptors in a URSP to establish PDU sessions targeting an SNPN by identifying mapping traffic descriptors by matching a preconfigured N3IWF ID to: 1) all received traffic descriptors; or 2) some received traffic descriptors. In such embodiments, the latter may be less tedious for a UE since the UE does not have to check all the traffic descriptors in received URSPs and may be possible if a traffic descriptor in the URSP is identified as a N3IWF ID. This may be implemented by using: 1) a new type for a traffic descriptor that may be dedicated only for a N3IWF ID for accessing an SNPN—the traffic descriptor may be called "SNPN N3IWF Identifier" and if the UE receives the URSP rules with such a traffic descriptor, the UE matches the traffic descriptor to a preconfigured SNPN's N3IWF ID and, if there is a match, the UE uses mapping route selection descriptors to establish PDU session targeting to the SNPN; or 2) a new type for a UE policy part for the SNPN—the new type of the UE policy part includes the N3IWF ID and the related route selection descriptors for PDU sessions targeting the SNPN which may be reached by the N3IWF ID. FIG. 6 illustrates a new format of a UE policy sent by a PLMN. If the N3IWF ID in the SNPN rules matches a preconfigured SNPN's N3IWF ID, the UE uses mapping route selection descriptors to establish PDU session targeting the SNPN.

Specifically, FIG. 6 is a block diagram illustrating one embodiment of a format 600 of a UE policy sent by a PLMN. The format 600 includes a UE policy section management list 602, which includes an SNPN ID 604. The SNPN ID 604 identifies a UE policy 606. Moreover, the UE policy 606 includes URSP 608, AND SP 610, and/or SNPN rules 612. Furthermore, the URSP 608 includes a route selection descriptor 614 and a traffic descriptor 616. The AND SP 610 includes a WLANSP rule 618 and an N3AN rule 620. Moreover, the SNPN rules 612 includes a route selection descriptor 622 and an N3IWF ID 624.

Figure 7:
FIG. 7 is a communications diagram illustrating one embodiment of PDU session establishment targeting a SNPN.

FIG. 7 illustrates a PDU session establishment procedure targeting an SNPN. In some embodiments, a UE receives UE policies from a PLMN. In such embodiments, the UE may receive UE policies to establish a PDU session targeting the SNPN. Moreover, the UE may be a multi USIM UE with an independent registration to an SNPN or it may register with the SNPN via the PLMN. For the UE to establish a PDU session targeted for the SNPN, the UE may proceed as described in relation to FIG. 7.

Specifically, FIG. 7 is a communications diagram 700 illustrating one embodiment of PDU session establishment targeting a SNPN. The illustrated communications include communications between a UE 702, a RAN 704, an AMF 706 (e.g., PLMN), a PCF 708 (e.g., PLMN), an N3IWF 710, and an AMF/SMF/UPF 712. Any of the communications in the communication diagram 700 may include one or more messages.

In a first communication 714 transmitted between the UE 702, the RAN 704, the AMF 706, the PCF 708, the N3IWF 710, and the AMF/SMF/UPF 712, the UE 702 is registered to the PLMN and an associated SNPN. The registrations may be performed independently if the UE 702 is a multi USIM UE or has multi USIM applications. If the UE 702 does not have any multi USIM applications or the UE 702 is not a Multi USIM UE, the registration to the SNPN may be via a registration to the PLMN.

In a second communication 716 transmitted between the UE 702, the RAN 704, the AMF 706, and the PCF 708, the UE policy for the PLMN is transmitted towards the UE 702. The UE policy may include information about route selection descriptors for establishing PDU sessions targeting the SNPN.

To identify the route selection descriptors for establishing PDU session targeting the SNPN, the UE 702 may locate an N3IWF identifier within the received UE policies which matches the preconfigured N3IWF ID to reach that SNPN by matching to the preconfigured SNPN's N3IWF ID: 1) all the traffic descriptors 718 in the received URSP; 2) the traffic descriptors 720 with the type for SNPN's N3IWF ID in the received URSP; or 3) the N3IWF ID 722 in the SNPN rules as shown in FIG. 6.

In a third communication 724 transmitted between the UE 702, the RAN 704, the AMF 706, the PCF 708, the N3IWF 710, and the AMF/SMF/UPF 712, once the N3IWF identifier for reaching the SNPN is located, the UE 702 may establish a PDU session by using the rules in the mapping route selection descriptors targeted the SNPN via the N3IWF identified by the N3IWF identifier.

In certain embodiments, a traffic descriptor in the received URSP may have more components than a destination FQDN or a remote IP address. In such embodiments, the traffic descriptor may have information about an operating system and/or an application identifier for the operating system and/or connection capabilities. The additional components for the traffic descriptor may include requirements that the UE may need to consider if establishing the PDU session targeted to the SNPN. In one example, the traffic descriptor may include an FQDN matching the N3IWF identifier and a component for connection capability for an IP multimedia subsystem ("IMS") and a component for an OS App ID. This information may require that an established PDU session targeted to the SNPN is an IMS PDU session for a certain application with the OS App ID as an identifier. Various components which may be used for traffic descriptors.

In various embodiments, an N3IWF ID, which is a part of SNPN rules, may include several components as traffic descriptors to add more requirements.

FIG. 8 is a flow chart diagram illustrating one embodiment of a method 800 for policies related to non-public networks. In some embodiments, the method 800 is performed by an apparatus, such as the network unit 104. In certain embodiments, the method 800 may be performed by a processor executing program code, for example, a micro-controller, a microprocessor, a CPU, a GPU, an auxiliary processing unit, a FPGA, or the like.

In various embodiments, the method 800 includes receiving 802, at an access and mobility management function, a request to register a device. In some embodiments, the method 800 includes, in response to receiving the request to register the device, transmitting 804, by the access and mobility management function, a user equipment subscription data request to a unified data management. In various embodiments, the method 800 includes, in response to transmitting the user equipment subscription data request to the unified data management, receiving 806 a user equipment subscription data response comprising a first identifier wherein the first identifier identities a stand-alone non-public network. In certain embodiments, the method 800 includes performing 808 an access and mobility management policy association establishment with a policy control function based on the user equipment subscription data. In some embodiments, the method 800 includes, after performing the access and mobility management policy association establishment and transparently receiving a user equipment policy section identifier comprising the first identifier from the device, transparently transmitting 810 by the policy control function a policy based on the first identifier, to the device comprising: a second identifier that identifies a network access function to the stand-alone non-public network; and a route selection descriptor for establishing a packet data unit session targeting the stand-alone non-public network via the network access function.

In some embodiments, the unified data management obtains the user equipment subscription data from a unified data repository.

Figure 9:
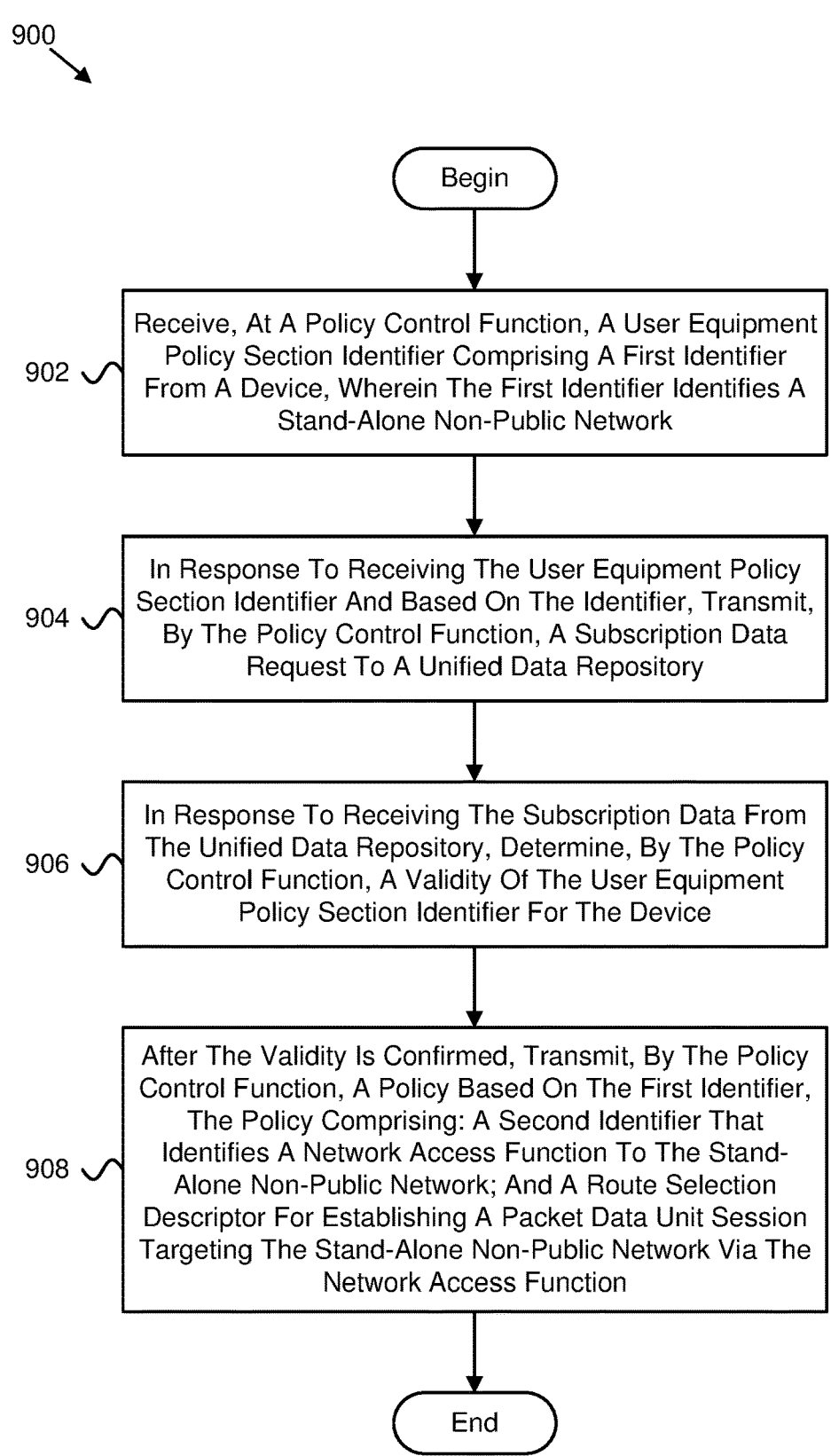
FIG. 9 is a flow chart diagram illustrating another embodiment of a method for policies related to non-public networks.

FIG. 9 is a flow chart diagram illustrating another embodiment of a method 900 for policies related to non-public networks. In some embodiments, the method 900 is performed by an apparatus, such as the network unit 104. In certain embodiments, the method 900 may be performed by a processor executing program code, for example, a microcontroller, a microprocessor, a CPU, a GPU, an auxiliary processing unit, a FPGA, or the like.

In various embodiments, the method 900 includes receiving 902, at a policy control function, a user equipment policy section identifier comprising a first identifier from a device, wherein the first identifier identifies a stand-alone non-public network. In some embodiments, the method 900 includes, in response to receiving the user equipment policy section identifier and based on the identifier, transmitting 904, by the policy control function, a subscription data request to a unified data repository. In various embodiments, the method 900 includes, in response to receiving the subscription data from the unified data repository, determining 906, by the policy control function, a validity of the user equipment policy section identifier for the device. In certain embodiments, the method 900 includes, after the validity is confirmed, transmitting 908, by the policy control function, a policy based on the first identifier, the policy comprising: a second identifier that identifies a network access function to the stand-alone non-public network; and a route selection descriptor for establishing a packet data unit session targeting the stand-alone non-public network via the network access function.

FIG. 10 is a flow chart diagram illustrating a further embodiment of a method 1000 for policies related to non-public networks. In some embodiments, the method 1000 is performed by an apparatus, such as the remote unit 102. In certain embodiments, the method 1000 may be performed by a processor executing program code, for example, a microcontroller, a microprocessor, a CPU, a GPU, an auxiliary processing unit, a FPGA, or the like.

In various embodiments, the method 1000 includes receiving 1002, by a device, a policy comprising a user equipment route selection policy from a policy control function, wherein the user equipment route selection policy comprises: a traffic descriptor; and mapping route selection descriptors. In some embodiments, the method 1000 includes identifying 1004, by the device, the traffic descriptor with the mapping route selection descriptors, wherein the traffic descriptor matches an identifier that is preconfigured in the device. In various embodiments, the method 1000 includes using 1006, by the device, the identifier as a remote destination address to establish a packet data unit session, by the mapping route selection descriptors, targeted to a stand-alone non-public network.

In some embodiments, the identifier is received in the traffic descriptor, and the identifier comprises a format: 3iwf.5gc.nid<NID>.mnc<MNC>.mcc<MCC>.pub.3gppnetwork.org. In various embodiments, the identifier has an internet protocol address type comprising: IPv4; IPv6; or IPv4IPv6. In certain embodiments, the identifier comprises a fully qualified domain name type. In one embodiment, the traffic descriptor is a component that indicates the identifier.

FIG. 11 is a flow chart diagram illustrating yet another embodiment of a method 1100 for policies related to non-public networks. In some embodiments, the method 1100 is performed by an apparatus, such as the remote unit 102. In certain embodiments, the method 1100 may be performed by a processor executing program code, for example, a microcontroller, a microprocessor, a CPU, a GPU, an auxiliary processing unit, a FPGA, or the like.

In various embodiments, the method 1100 includes receiving 1102, by a device, a policy from a policy control function, wherein the policy comprises: an identifier; and mapping route selection descriptors. In various embodiments, the identifier maps 1104 a preconfigured remote destination address to access a stand-alone non-public network; and the mapping route selection descriptors establishing a packet data unit session targeted to the stand-alone non-public network.

In some embodiments, the policy is for stand-alone non-public network rules.

In one embodiment, a method comprises: receiving, at an access and mobility management function, a request to register a device; in response to receiving the request to register the device, transmitting, by the access and mobility management function, a user equipment subscription data request to a unified data management; in response to transmitting the user equipment subscription data request to the unified data management, receiving a user equipment subscription data response comprising a first identifier wherein the first identifier identities a stand-alone non-public network; performing an access and mobility management policy association establishment with a policy control function based on the user equipment subscription data; and, after performing the access and mobility management policy association establishment and transparently receiving a user equipment policy section identifier comprising the first identifier from the device, transparently transmitting by the policy control function a policy based on the first identifier, to the device comprising: a second identifier that identifies a network access function to the stand-alone non-public network; and a route selection descriptor for establishing a packet data unit session targeting the stand-alone non-public network via the network access function.

In some embodiments, the unified data management obtains the user equipment subscription data from a unified data repository.

In one embodiment, an apparatus comprises an access and mobility management function. The apparatus further comprises: a receiver that receives a request to register a device; a transmitter that, in response to receiving the request to register the device, transmits a user equipment subscription data request to a unified data management; and a processor, wherein: in response to transmitting the user equipment subscription data request to the unified data management, the receiver receives a user equipment subscription data response comprising a first identifier wherein the first identifier identities a stand-alone non-public network; the processor performs an access and mobility management policy association establishment with a policy control function based on the user equipment subscription data; and the transmitter, after performing the access and mobility management policy association establishment and the receiver transparently receives a user equipment policy section identifier comprising the first identifier from the device, transmits transparently by the policy control function a policy based on the first identifier, to the device comprising: a second identifier that identifies a network access function to the stand-alone non-public network; and a route selection descriptor for establishing a packet data unit session targeting the stand-alone non-public network via the network access function.

In some embodiments, the unified data management obtains the user equipment subscription data from a unified data repository.

In one embodiment, a method comprises: receiving, at a policy control function, a user equipment policy section identifier comprising a first identifier from a device, wherein the first identifier identifies a stand-alone non-public network; in response to receiving the user equipment policy section identifier and based on the identifier, transmitting, by the policy control function, a subscription data request to a unified data repository; in response to receiving the subscription data from the unified data repository, determining, by the policy control function, a validity of the user equipment policy section identifier for the device; and, after the validity is confirmed, transmitting, by the policy control function, a policy based on the first identifier, the policy comprising: a second identifier that identifies a network access function to the stand-alone non-public network; and a route selection descriptor for establishing a packet data unit session targeting the stand-alone non-public network via the network access function.

In one embodiment, an apparatus comprises a policy control function. The apparatus further comprises: a receiver that receives a user equipment policy section identifier comprising a first identifier from a device, wherein the first identifier identifies a stand-alone non-public network; a transmitter that, in response to receiving the user equipment policy section identifier and based on the identifier, transmits a subscription data request to a unified data repository; and a processor that, in response to receiving the subscription data from the unified data repository, determines a validity of the user equipment policy section identifier for the device; wherein: the transmitter, after the validity is confirmed, transmits a policy based on the first identifier, the policy comprising: a second identifier that identifies a network access function to the stand-alone non-public network; and a route selection descriptor for establishing a packet data unit session targeting the stand-alone non-public network via the network access function.

In one embodiment, a method comprises: receiving, by a device, a policy comprising a user equipment route selection policy from a policy control function, wherein the user equipment route selection policy comprises: a traffic descriptor; and mapping route selection descriptors; identifying, by the device, the traffic descriptor with the mapping route selection descriptors, wherein the traffic descriptor matches an identifier that is preconfigured in the device; and using, by the device, the identifier as a remote destination address to establish a packet data unit session, by the mapping route selection descriptors, targeted to a stand-alone non-public network.

In some embodiments, the identifier is received in the traffic descriptor, and the identifier comprises a format: 3iwf.5gc.nid<NID>.mnc<MNC>.mcc<MCC>.pub.3gppnetwork.org.

In various embodiments, the identifier has an internet protocol address type comprising: IPv4; IPv6; or IPv4IPv6.

In certain embodiments, the identifier comprises a fully qualified domain name type.

In one embodiment, the traffic descriptor is a component that indicates the identifier.

In one embodiment, an apparatus comprises: a receiver that receives a policy comprising a user equipment route selection policy from a policy control function, wherein the user equipment route selection policy comprises: a traffic descriptor; and mapping route selection descriptors; and a processor that: identifies the traffic descriptor with the mapping route selection descriptors, wherein the traffic descriptor matches an identifier that is preconfigured in the apparatus; and uses the identifier as a remote destination address to establish a packet data unit session, by the mapping route selection descriptors, targeted to a stand-alone non-public network.

In some embodiments, the identifier is received in the traffic descriptor, and the identifier comprises a format: 3iwf.5gc.nid<NID>.mnc<MNC>.mcc<MCC>.pub.3gppnetwork.org.

In various embodiments, the identifier has an internet protocol address type comprising: IPv4; IPv6; or IPv4IPv6.

In certain embodiments, the identifier comprises a fully qualified domain name type.

In one embodiment, the traffic descriptor is a component that indicates the identifier.

In one embodiment, a method comprises: receiving, by a device, a policy from a policy control function, wherein the policy comprises: an identifier; and mapping route selection descriptors; wherein: the identifier maps a preconfigured remote destination address to access a stand-alone non-public network; and the mapping route selection descriptors establishing a packet data unit session targeted to the stand-alone non-public network.

In some embodiments, the policy is for stand-alone non-public network rules.

In one embodiment, an apparatus comprises: a receiver that receives a policy from a policy control function, wherein the policy comprises: an identifier; and mapping route selection descriptors; wherein: the identifier maps a preconfigured remote destination address to access a stand-alone non-public network; and the mapping route selection descriptors establishing a packet data unit session targeted to the stand-alone non-public network.

In some embodiments, the policy is for stand-alone non-public network rules.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by an access and mobility management function (AMF) that is part of a public land mobile network (PLMN) and not part of a stand-alone non-public network (NPN), the method comprising:

receiving a request to register a user equipment (UE) from the UE;

in response to receiving the request to register the UE, transmitting a UE subscription data request to a unified data management (UDM);

in response to transmitting the UE subscription data request to the UDM, receiving a UE subscription data response comprising a first identifier, wherein the first identifier identifies the stand-alone NPN;

performing an access and mobility management policy association establishment with a policy control function (PCF) based on the UE subscription data; and after performing the access and mobility management policy association establishment, transparently receiving a UE policy section identifier list comprising the first identifier from the UE.

2. The method of claim 1, wherein the UE subscription data is from a unified data repository.

3. An access and mobility management function (AMF) that is part of a public land mobile network (PLMN) and not part of a stand-alone non-public network (NPN), the AMF comprising:

at least one memory; and at least one processor coupled with the at least one memory and configured to cause the AMF to:

receive a request to register a user equipment (UE) from the UE;

in response to receiving the request to register the UE, transmit a UE subscription data request to a unified data management (UDM);

in response to transmitting the UE subscription data request to the UDM, receive a UE subscription data response comprising a first identifier, wherein the first identifier identifies the stand-alone NPN;

perform an access and mobility management policy association establishment with a policy control function (PCF) based on the UE subscription data; and after performing the access and mobility management policy association establishment, transparently receive a UE policy section identifier comprising the first identifier from the UE.

4. The AMF of claim 3, wherein the UE subscription data is from a unified data repository.

5. A method performed by an access and mobility management function (AMF) that is part of a public land mobile network (PLMN) and not part of a stand-alone non-public network (NPN), the method comprising:

receiving a request to register a user equipment (UE) from the UE;

in response to receiving the request to register the UE, transmitting a UE subscription data request to a unified data management (UDM); and in response to transmitting the UE subscription data request to the UDM, receiving a UE subscription data response comprising a first identifier, wherein the first identifier identifies the stand-alone NPN.

6. The method of claim 5, further comprising performing an access and mobility management policy association establishment with a policy control function (PCF) based on the UE subscription data.

7. The method of claim 6, further comprising, after performing the access and mobility management policy association establishment, transparently receiving a UE policy section identifier comprising the first identifier from the UE.

8. The method of claim 5, wherein the UE subscription data is from a unified data repository.

9. An access and mobility management function (AMF) that is part of a public land mobile network (PLMN) and not part of a stand-alone non-public network (NPN), the AMF comprising:

at least one memory; and at least one processor coupled with the at least one memory and configured to cause the AMF to:

receive a request to register a user equipment (UE) from the UE;

in response to receiving the request to register the UE, transmit a UE subscription data request to a unified data management (UDM); and in response to transmitting the UE subscription data request to the UDM, receive a UE subscription data response comprising a first identifier, wherein the first identifier identifies the stand-alone NPN.

10. The AMF of claim 9, wherein the at least one processor is configured to cause the AMF to perform an access and mobility management policy association establishment with a policy control function (PCF) based on the UE subscription data.

11. The AMF of claim 10, wherein the at least one processor is configured to cause the AMF to, after performing the access and mobility management policy association establishment, transparently receive a UE policy section identifier comprising the first identifier from the UE.

12. The AMF of claim 9, wherein the UE subscription data is from a unified data repository.

* * * * *